(No Model.)  6 Sheets—Sheet 2.

I. L. G. RICE.
GROOVING MACHINE.

No. 353,376.  Patented Nov. 30, 1886.

WITNESSES
Frank G. Parker
Chas. Spaulding

INVENTOR
Israel L. G. Rice.

(No Model.) 6 Sheets—Sheet 5.
I. L. G. RICE.
GROOVING MACHINE.
No. 353,376. Patented Nov. 30, 1886.
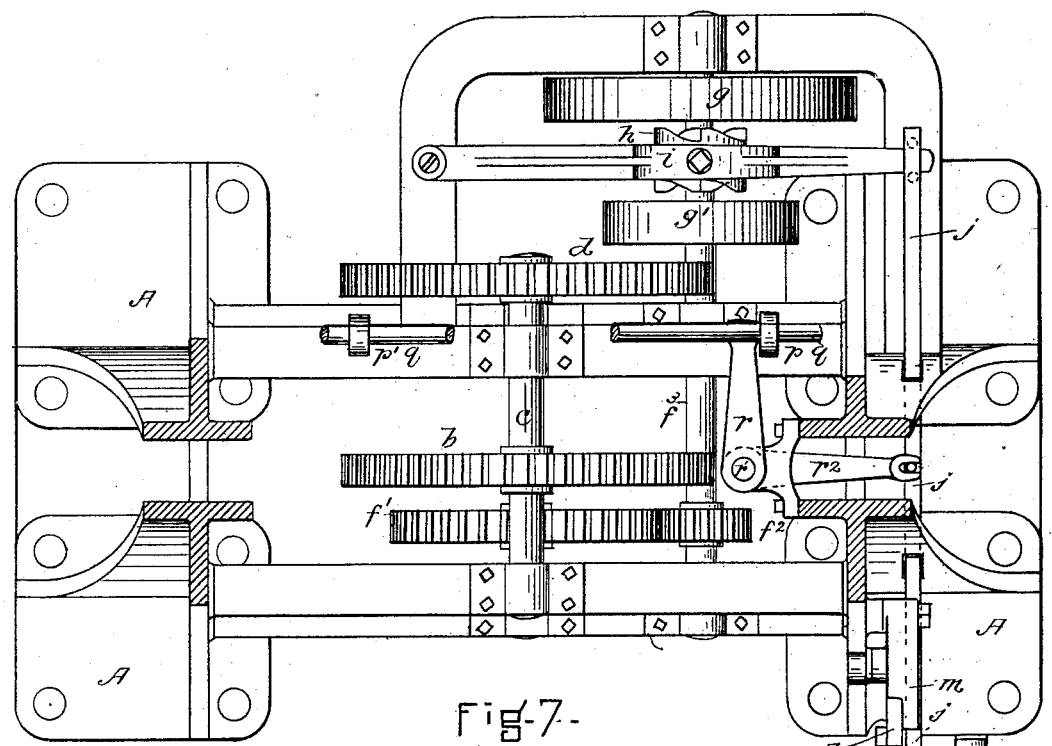
Fig-7-
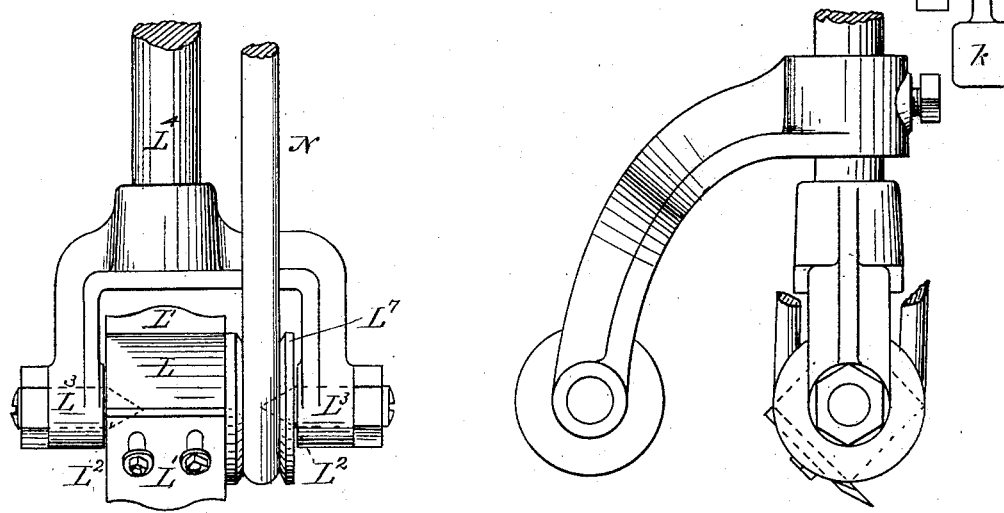
Fig-8- Fig-10-
WITNESSES
Frank G. Parker
Chas. Spaulding
INVENTOR
Israel L. G. Rice.

(No Model.) 6 Sheets—Sheet 6.
I. L. G. RICE.
GROOVING MACHINE.
No. 353,376. Patented Nov. 30, 1886.
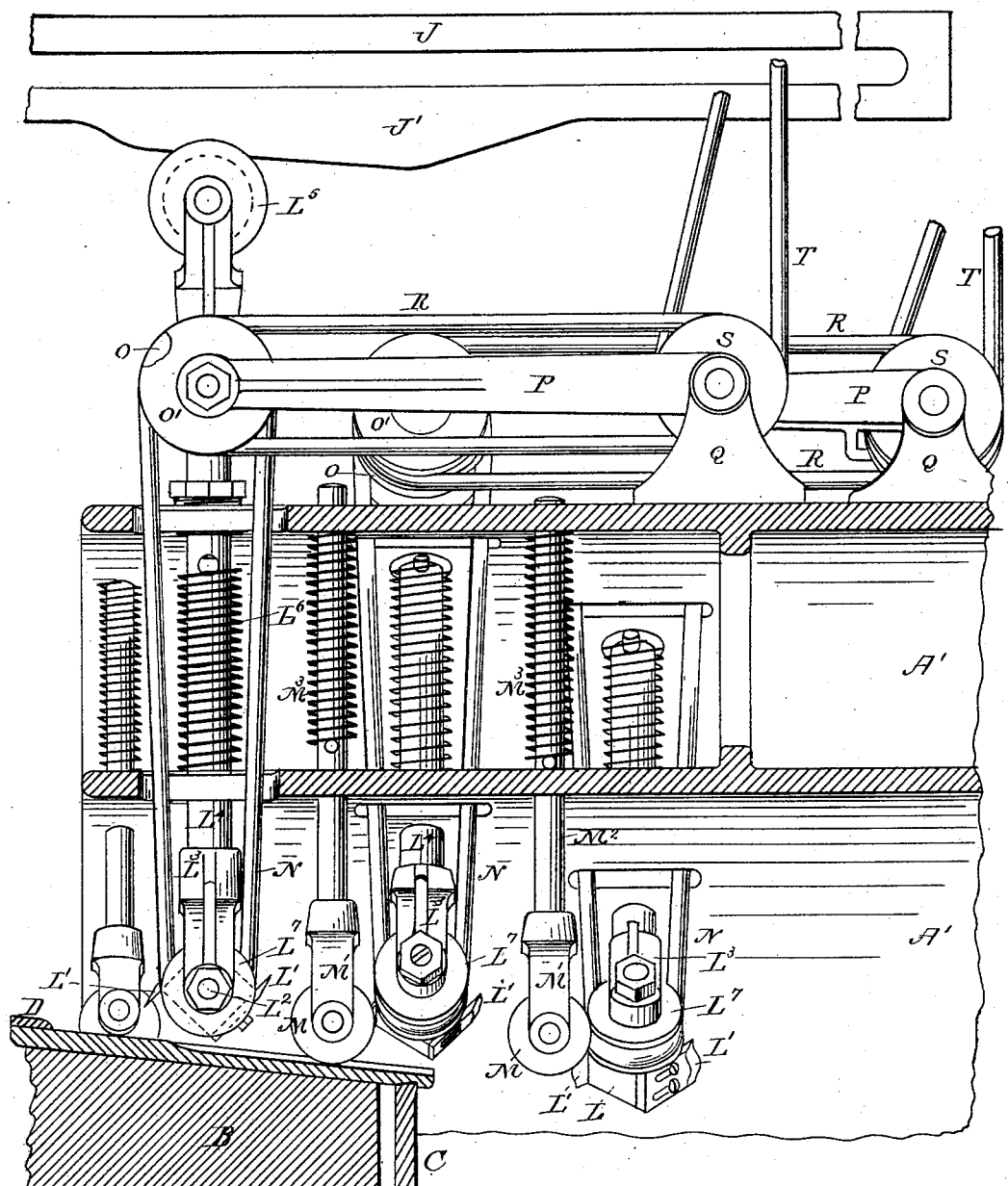
Fig-9-
WITNESSES
Frank H. Parker
Chas. Spaulding.
INVENTOR
Israel L. G. Rice.

UNITED STATES PATENT OFFICE.

ISRAEL L. G. RICE, OF BROOKLINE, MASSACHUSETTS.

GROOVING-MACHINE.

SPECIFICATION forming part of Letters Patent No. 353,376, dated November 30, 1886.

Application filed February 19, 1886. Serial No. 192,528. (No model.)

*To all whom it may concern:*

Be it known that I, ISRAEL L. G. RICE, a citizen of the United States, residing at Brookline, in the county of Norfolk and State of Massachusetts, have invented a new and useful Molding and Grooving Machine, of which the following is a specification.

My invention relates to improvements in molding and grooving machines in which a number of cutters are arranged in combination with a rest, upon which the article to be grooved is placed, which cutters operate so as to cut a number of grooves simultaneously; and the object of my invention is to provide an economical method of cutting the grooves in pails, tubs, &c., which are made with vertical grooves on their outer periphery, which grooves are for the reception of corrugated hoops, a pail of this kind having been patented by me in the United States, November 10, 1885, No. 330,153; and the particular object of my invention is to cut all these grooves at one and the same operation of the machine—that is, an ungrooved pail is put horizontally on a reciprocating rod on the machine, the operator steps on a treadle and starts the machine, the pail is moved into and through the center of a circle of revolving cutters, which cut all the grooves, and then the reciprocating rod draws back and automatically stops the machine, so that the operator may remove the grooved pail and put an uncut one in its place.

Figure 1:
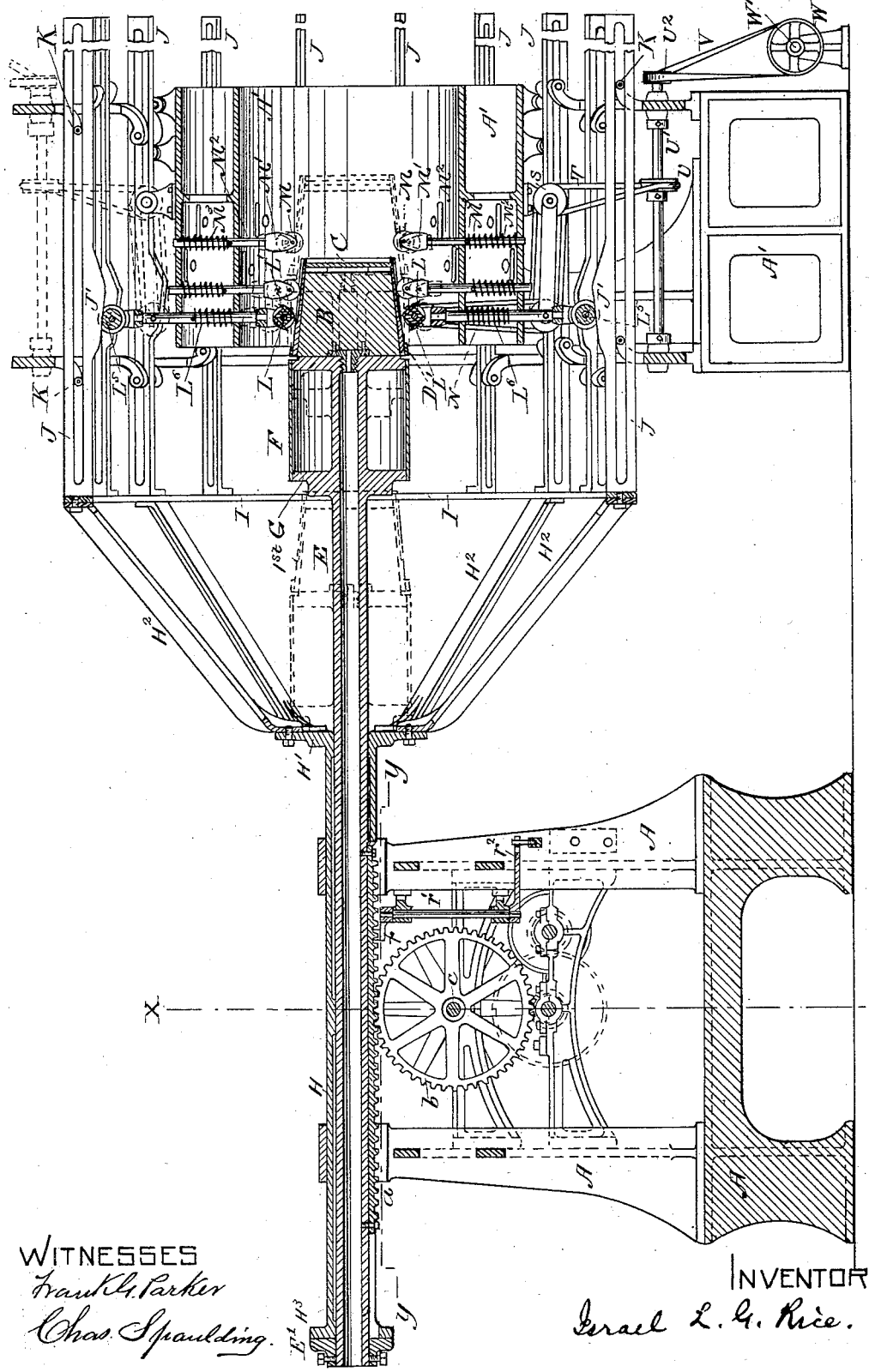
Figure 2:
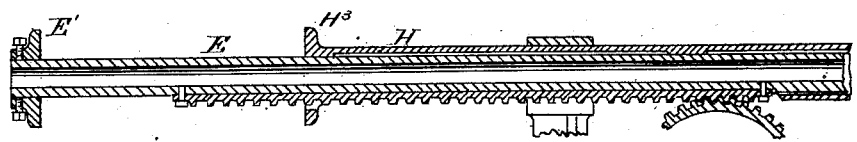
Figure 3:
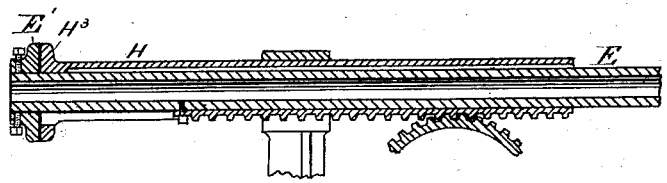
Figure 4:
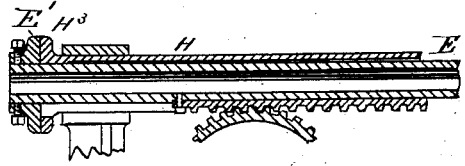
Figure 5:
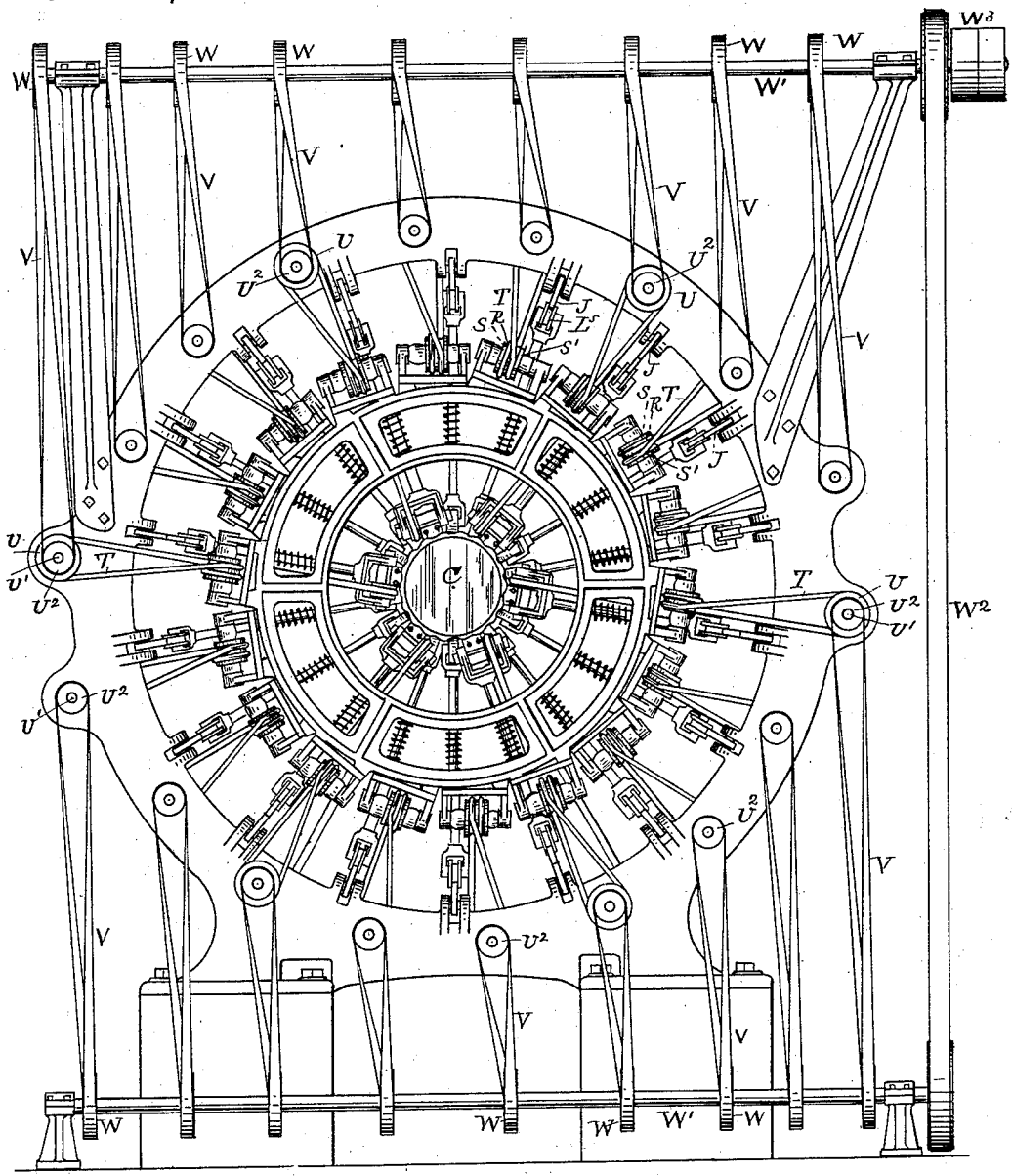
Figure 6:
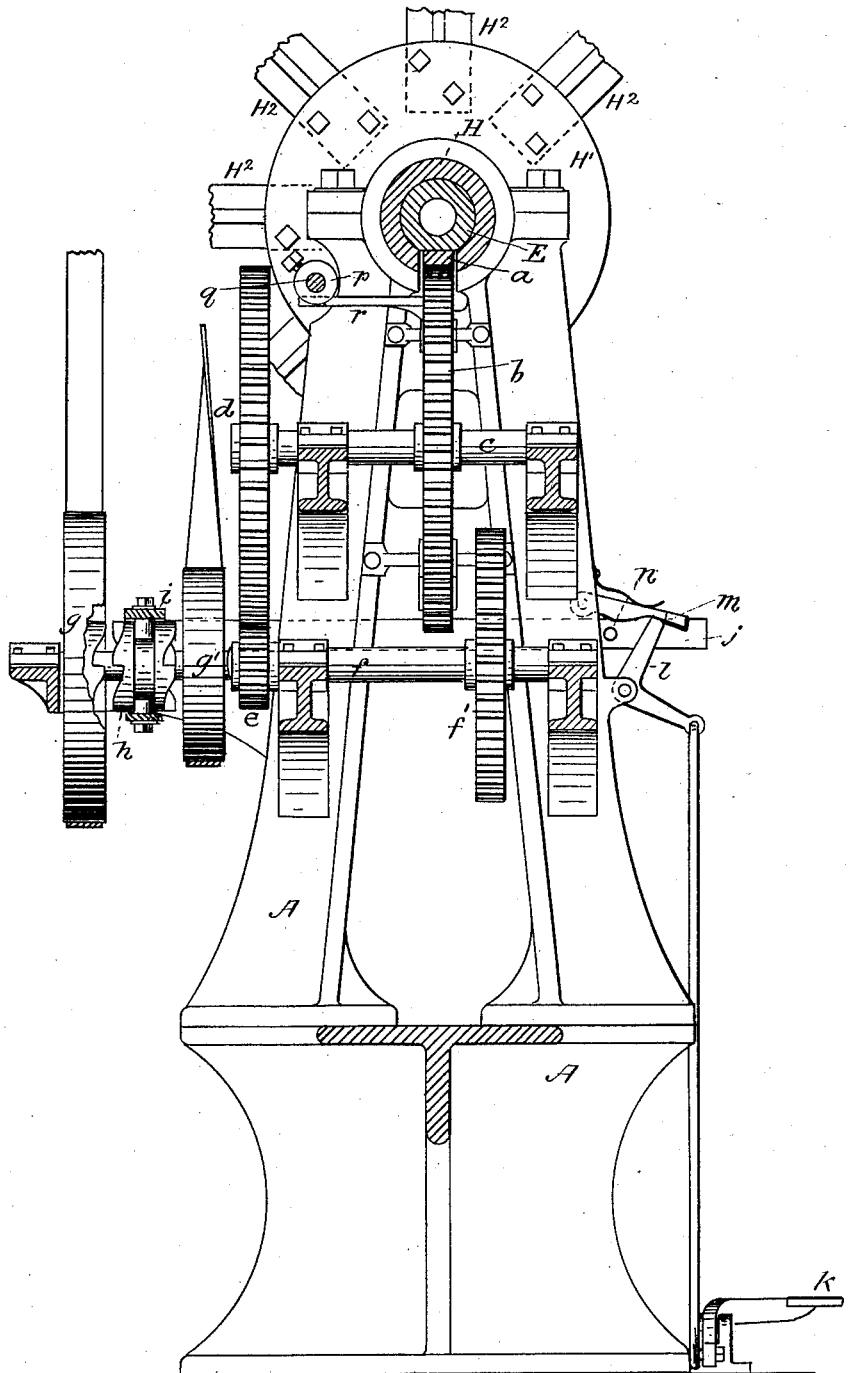

The machine is fully illustrated in the accompanying drawings, in which Figure 1 is a longitudinal vertical section of the machine, a number of the cutters and pressure-rolls being omitted. Figs. 2, 3, and 4 are sections and details of the inner and outer sleeves, illustrating the movements of these parts of the machine and their different positions. Fig. 5 is a rear elevation showing the system of belting and the arrangement of pressure-rolls and cutters. Fig. 6 is a sectional view on the line $x\ x$, Fig. 1, showing the system of gearing for the reciprocating movement of the pail and the clutch mechanism for operating it. Fig. 7 is a horizontal section taken on the line $y\ y$, showing the gearing and clutch mechanism and the reversing motion. Fig. 8 is a detail representing a front view of a cutter and its adjuncts. Fig. 9 is a large detail showing a part of the cutters, pressure-rolls, and cam-rod, and showing how the cutters and rolls are arranged on different planes, so as to get room for the bearings, pulleys, and belts of the cutters and rolls. Fig. 10 is a modification of the device for lifting the cutters and pressure-rolls, to be used in place of the cam-rods.

Similar letters refer to similar parts throughout the entire views.

A is the frame of that part of the machine which has the mechanism for holding and moving the pail in contact with the cutters, and, after the grooves are cut, drawing the pail away from the cutters.

A' is the frame of that part of the machine that contains the cutters and their operating mechanism.

B is the head on which the pail to be grooved is put. The pail is held on the head by the friction of its inside surface with the outer surface of the head.

C is the pail. On it at the top is a band of iron, D, put on temporarily, to keep the staves together while the pail is being grooved.

E is the sliding sleeve, to which the head B is fastened.

F is a drum of sheet-iron, through which the sleeve E passes to the head B. The object of this drum is to supply a support for the rolls that are connected with the cutters, and for the pressure-rolls to run upon while the pail is passing through the circle of cutters, which are arranged on different planes, so as to give more room for their bearings, pulleys, and belts. (This is more clearly shown in Fig. 9.)

G is a disk of iron, to which the drum F is fastened. The disk is secured to the sleeve E.

H is an outer sleeve, which has a flange, H', and to which is bolted the arms $H^2\ H^2\ H^2$, which are bolted to the ring I, and to this ring is fastened the cam-rods J J J, which as they are moved back and forth guide the cutters so that they will cut in uniformity with the taper of the pail and cut the grooves of equal depth as the pail moves in contact with the cutters.

K K K are rolls which are on the frame A', and which serve as guides and supports to the cam-rods J J J.

L L L are the cutter-heads with their cutters L' L' L'. (See Figs. 8 and 9.) These cutter-heads run in centers $L^2\ L^2\ L^2$, which are in the bearings L³ L³ L³. These bearings are fastened to the rods L⁴ L⁴ L⁴. At the ends of these rods are rollers L⁵ L⁵ L⁵, which are in contact with the cam-rods J J J, and as the cam-rods J J J move along the rollers L⁵ L⁵ L⁵ are pushed toward the pail by the projections J' J' J' on the cam-rods, thus forcing the cutters onto the pail. The springs L⁶ L⁶ L⁶ on the rods L⁴ L⁴ L⁴ keep the rollers L⁵ L⁵ L⁵ against the cam-rods J J J and the projections on the cam-rods J' J' J'.

M M M are pressure-rolls that keep the staves held firmly as they are being cut by the rotary cutters L' L' L'. M' M' M' are the bearings of these rolls.

M² M² M² are rods to which the bearings M' M' M' are fastened. These rods are held in proper position by being put in holes which serve as bearings in the frame A', and by means of the spiral springs M³ M³ M³ on these rods the rolls M M M are pressed against the staves of the pail, thus holding them firmly while they are being grooved.

The rotary cutters L' L' L' are driven by means of the round belts N N N, which drive the grooved pulleys L⁷ L⁷ L⁷, which are fast to the cutter-heads L L L. The round belts N N N are driven by the pulleys O O O, (see Fig. 9,) which are hung on the pivoted arms P P P, which are hung to the brackets Q Q Q, connected to the pulleys O O O. On the same shaft are the pulleys O' O' O'. These pulleys are driven by the belts R R R, Fig. 5. These belts are driven by the pulleys S S S. Fastened to these pulleys on the same shaft are the pulleys S' S' S'. These pulleys are driven by the belts T T T. (See Fig. 5.) These belts have a quarter-turn, and are driven by the pulleys U U U. These pulleys are on the shafts U' U', on which shafts are the pulleys U² U² U². These are driven by the belts V V V, which belts are driven by the pulleys W W W on the main shafts W' W'. These shafts are driven at the same speed by means of the connecting-belt W².

W³ is the driving-pulley of the mechanism for operating the cutters just described, and it may be driven by a belt from a counter-shaft above the machine.

The operation of the machine is as follows: The pail C is put on the head B on the sliding sleeve E. This head is in the position (see Fig. 1) indicated by the dotted lines marked 1st. The pail C is moved forward so as to bring it in contact with the cutters L' L' L' by means of the rack a, which is fastened to the sliding sleeve E, and which is driven by the gear b. (See Figs. 6 and 7.) This gear is fast to its shaft c. On one end of this shaft is the gear d, which is driven by the pinion e on the shaft f. This shaft is driven by means of the gear f' on the shaft f, which is driven by the pinion f² on the shaft f³. On this shaft are the loose clutch-pulleys g g', which revolve in opposite directions, being driven by belts from a counter-shaft. g is the clutch-pulley that when the clutch h is thrown in contact with it turns the shaft f³, and thus causes the pinion f² on this shaft to turn the gear f' on the shaft f, so that the pinion e turns the gear d on the shaft c, so as to cause the gear b, which is fast to this shaft, to drive the rack a forward, and thus move the sleeve E, which has the pail on it, in contact with the cutters. The clutch h is constantly revolving either one way or the other when the machine is in operation, because it turns with the shaft f², because there is a spline on the shaft and a keyway cut in the clutch. The clutch is operated by means of the lever i, (see Fig. 7,) which is moved by the rod j. (See Fig. 6.) This rod is first moved, when the machine is put in operation by the operator, by pressing on the treadle k, which moves the bell-crank-lever connection l and lifts the latch m, which was holding the rod j in position, and then the end of the bell-crank lever l strikes a pin, n, on the rod j and moves this rod, which, being in connection with the lever i, forces the clutch h into gear with the clutch-pulley g. This causes the mechanism previously described in detail to move forward the rack a, fastened to the sleeve E, to which the pail is fastened. (See Figs. 1, 2, 3, and 4 for the different positions of the sleeve E.) As the sleeve E moves forward the flange E' on this sleeve strikes against the flange H³ on the outer sleeve, H. (See Fig. 3.) This causes the sleeve H, with the connected arms H² H² H², ring I, and cam-rolls J J J, to move forward, so that the projections J' J' J' on these rods press the cutters L' L' L' against the pail, as previously described. As soon as the pail has moved far enough so that all the grooves have been cut, a tappet, p, (see Fig. 7,) on the sliding rod q, which rod is fastened to the flange H' on the outer sliding sleeve, H, strikes the tappet-arm r on the vertical tappet-rod r', pushing it so that it causes the tappet-arm r² to move the rod j. The movement of this rod causes the lever i to move the clutch into gear with the loose clutch-pulley g', and as this pulley is revolving in an opposite direction from the other loose clutch-pulley, g, on the same shaft the clutch h turns in an opposite direction, reversing the rotation of the shaft f³ and the connecting-gearing, so that the rack a, with the sleeve E and pail C, is withdrawn from the cutters. When the sleeve E is moving back to its original position, the disk G on the sleeve E strikes against the flange H' on the sliding sleeve H and forces it back to its original position. While the flange H' moves back, it also moves back the tappet-rod q, (see Fig. 7,) that is connected with it. This causes the tappet p' to strike the tappet-arm r and push back the tappet-arm r² until it moves the sliding rod j back to its original position, which position is shown in Fig. 7, and which is in such position as to have moved the lever i straight, so that the clutch h is out of gear with either of the loose clutch-pulleys g g' and the reciprocating movement of the pail with the connecting mechanism has stopped. The operator then removes the pail and puts another in its place, then steps on the treadle, and the movements of the machine just described are repeated.

In various ways different parts of the machine may be modified and changed without affecting its general principle.

Fig. 10 illustrates a modification of the mechanism for guiding the cutters on the pail, to be used in place of the cam-rods J J J and their operating mechanism. The device consists in simply applying pressure-rolls a little in advance and on one side of the cutters, so as to press upon that part of the pail that remains ungrooved, and thus guide the cutters, the roll on each cutter-rod lifting the cutter to its proper height.

Another modification may be made—but which is substantially the same principle and an equivalent to the machine fully described—by reversing the arrangement of the two parts of the machine and causing the part on which is the pail to give no motion to the pail, but simply to hold it, while the part of the machine on which are the cutters has a reciprocating motion, and moves forward and grooves the pail and then moves back, so that the operator may take the pail off the head and replace it with an ungrooved pail; but the better way is, I think, for the pail to have a reciprocating motion to and from the cutters.

It is obvious that the machine may be made with its pressure-rolls and cutters adjustable, and that it may be made of any desired size. It can be used to cut grooves or fancy moldings in wood; or by regulating the speed of the reciprocating head and the cutters and making the cutters of proper shape the machine can be used in shaping metals, cutting gears, &c.

This machine, as previously stated, was designed for the purpose of grooving pails, and the accompanying drawings have been taken in reduced form from the actual drawings of a machine now in process of construction and nearly finished, which weighs upward of two tons.

I do not limit myself to the exact arrangements of the parts of the machine herein described. The cutters may be of various kinds. Their arrangement may be in circular or irregular form. The head on which the article to be cut is placed may have a reciprocating motion, or it may remain stationary.

What I claim as my invention, and desire to secure by Letters Patent, is—

1. The combination, in a grooving-machine, of the frame A, having a reciprocating sleeve or rod, E, and its operative mechanism, to which rod is attached a head or rest, B, upon which is put the article to be grooved, with the frame A', which frame is opposite to the frame A and may be on the same bed-plate with it, the frame A' having a number of cutters, L' L' L', arranged in circular or angular order, the cutting-edge of the cutters being at such a distance apart from one another as to admit of the article on the head B pressing into the circle of cutters, so that a number of longitudinal grooves may be cut in various parts of the periphery or the entire periphery of the article on the head at one operation of the machine, substantially as set forth.

2. The combination, in a grooving-machine, of the frame A, having a reciprocating sleeve or rod, E, and its operative mechanism, to which rod is attached a head or rest, B, upon which is put the article to be grooved, with the frame A', which frame is opposite to the frame A and may be on the same bed-plate with it, the frame A' having a number of pressure-rolls, M M M, and cutters L' L' L', arranged in circular or angular order, the cutting-edges of the cutters being at such a distance apart from one another as to admit of the article on the head B passing into the circle of cutters, so that a number of longitudinal grooves may be cut in various parts of the periphery or the entire periphery of the article on the head at one operation of the machine, substantially as set forth.

3. The combination, in a grooving-machine, of the frame A, having a reciprocating sleeve or rod, E, and its operative mechanism, to which rod is attached a head or rest, B, upon which is put the article to be grooved, with the frame A', which frame is opposite to the frame A and may be on the same bed-plate with it, the frame A' having a number of pressure-rolls, M M M, and cam-rods J J J, cutter-rods L⁴ L⁴ L⁴, and the cutters L' L' L', arranged in circular or angular order, the cutting-edges of the cutters being at such a distance apart from one another as to admit of the article on the head B pressing into the circle of cutters, so that a number of longitudinal grooves may be cut in various parts of the periphery or the entire periphery of the article on the head at one operation of the machine, substantially as set forth.

ISRAEL L. G. RICE.

Witnesses:
CHAS. SPAULDING,
FRANK G. PARKER.